United States Patent
Martindale

(10) Patent No.: US 7,591,253 B2
(45) Date of Patent: Sep. 22, 2009

(54) SECONDARY FUEL SYSTEM FOR DIESEL ENGINES

(75) Inventor: Michael Martindale, Paul, ID (US)

(73) Assignee: Proinjects, L.L.C., Paul, ID (US)

( * ) Notice: Subject to any disclaimer, the term of this patent is extended or adjusted under 35 U.S.C. 154(b) by 103 days.

(21) Appl. No.: 11/830,097

(22) Filed: Jul. 30, 2007

(65) Prior Publication Data

US 2008/0022983 A1 Jan. 31, 2008

Related U.S. Application Data

(60) Provisional application No. 60/834,141, filed on Jul. 28, 2006.

(51) Int. Cl.
*F02B 3/06* (2006.01)
*F02B 13/00* (2006.01)
*F02M 21/02* (2006.01)

(52) U.S. Cl. .................. 123/525; 123/27 GE; 123/557; 123/575

(58) Field of Classification Search ............. 123/27 GE, 123/525, 557, 575
See application file for complete search history.

(56) References Cited

U.S. PATENT DOCUMENTS

| | | | |
|---|---|---|---|
| 1,642,579 A * | 9/1927 | Crain | 123/575 |
| 2,424,723 A | 7/1947 | Tate | |
| 2,544,978 A | 3/1951 | Blessing | |
| 3,540,419 A | 11/1970 | Fox | |
| 3,698,365 A | 10/1972 | Hallberg | |
| 4,168,685 A | 9/1979 | Little et al. | |
| 4,278,064 A | 7/1981 | Regueiro | |
| 4,393,848 A | 7/1983 | Poehlman | |
| 4,416,244 A * | 11/1983 | McDonald | 123/27 GE |
| 4,463,734 A | 8/1984 | Akeroyd | |
| 4,476,827 A | 10/1984 | Basaglia et al. | |
| 4,513,727 A | 4/1985 | Lagano et al. | |
| 4,517,928 A | 5/1985 | Wolters | |
| 4,520,766 A | 6/1985 | Akeroyd | |
| 4,535,728 A | 8/1985 | Batchelor | |
| 4,637,353 A | 1/1987 | Codrington | |
| 4,909,209 A * | 3/1990 | Takahasi | 123/27 GE |
| 5,224,457 A | 7/1993 | Arsenault et al. | |
| 5,355,854 A * | 10/1994 | Aubee | 123/27 GE |
| 5,370,097 A * | 12/1994 | Davis | 123/27 GE |
| 5,408,957 A * | 4/1995 | Crowley | 123/27 GE |
| 6,073,862 A | 6/2000 | Touchette et al. | |
| 6,202,601 B1 | 3/2001 | Ouellette et al. | |
| 6,250,260 B1 | 6/2001 | Green | |
| 6,439,192 B1 | 8/2002 | Ouellette et al. | |
| 6,601,566 B2 | 8/2003 | Gillis et al. | |
| 6,901,889 B1 | 6/2005 | Ritter et al. | |
| 7,019,626 B1 * | 3/2006 | Funk | 123/525 |

* cited by examiner

*Primary Examiner*—Noah Kamen
(74) *Attorney, Agent, or Firm*—Dunlap Codding, P.C.

(57) ABSTRACT

An engine system comprising a secondary fuel source for providing a secondary fuel, a metering valve for delivering the secondary fuel at a substantially pre-determined rate, an air intake, and an internal combustion engine. The metering valve comprises a valve body and a selectively-adjustable static valve mechanism. The valve body is provided with a fuel inlet in fluid communication with the secondary fuel source to receive the secondary fuel from the secondary fuel source, a fuel outlet, and a fuel passage between the fuel inlet and the fuel outlet. The selectively-adjustable static valve mechanism is disposed within the fuel passage of the valve body. The air intake is in fluid communication with the fuel outlet of the metering valve to receive the secondary fuel from the metering valve to permit the secondary fuel to mix with air.

12 Claims, 5 Drawing Sheets

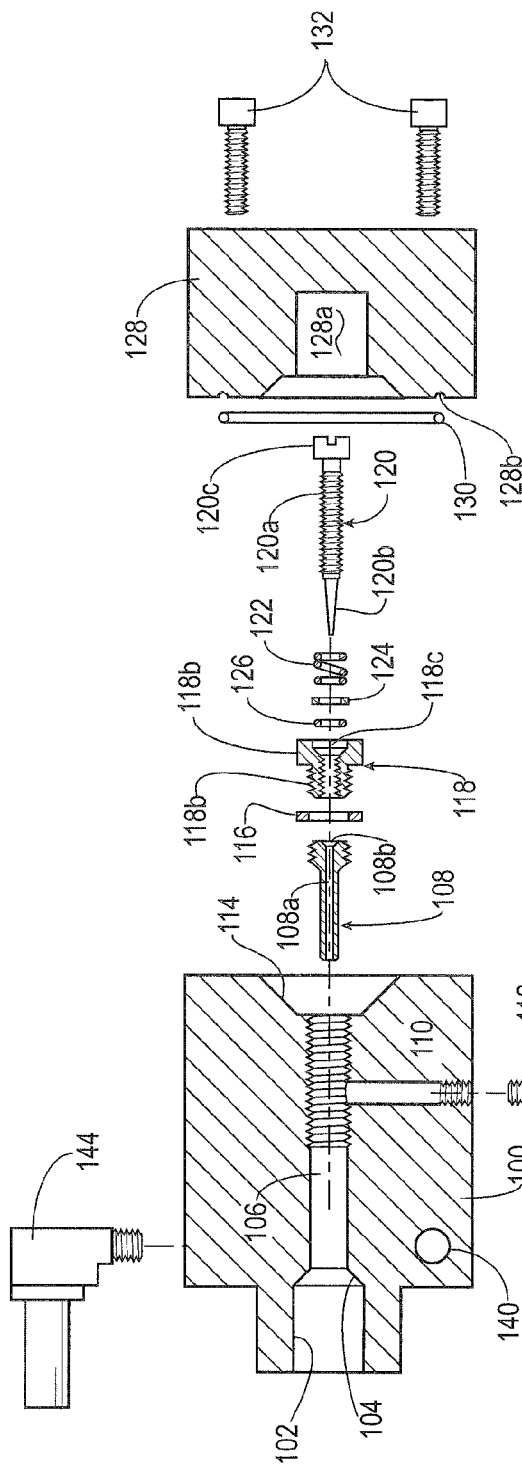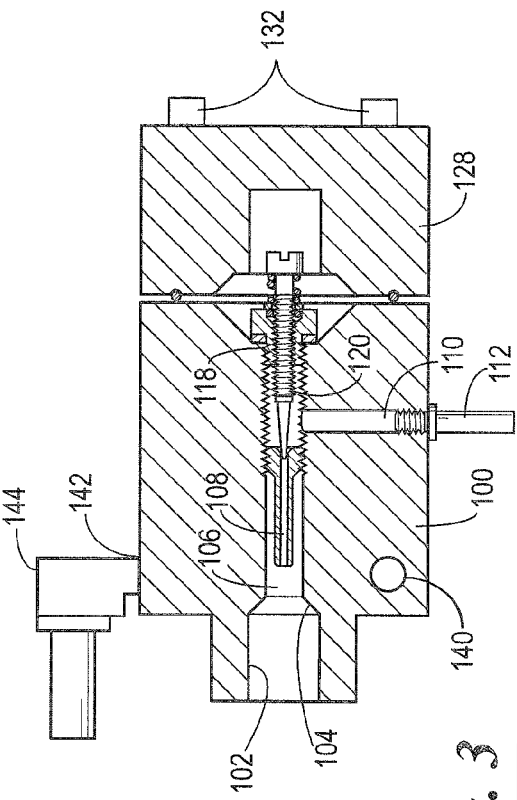
Fig. 2
Fig. 3

SECONDARY FUEL SYSTEM FOR DIESEL ENGINES

CROSS-REFERENCE TO RELATED APPLICATIONS

This application claims benefit of U.S. Provisional Application No. 60/834,141, filed Jul. 28, 2006, which is incorporated herein by reference in its entirety.

BACKGROUND OF THE INVENTION

1. Field of the Invention

This invention relates generally to a secondary fuel system for diesel engines. More particularly, but not by way of limitation, this invention relates to a system for delivering a gaseous fuel such as propane or natural gas into the intake air of a diesel engine.

2. Brief Description of the Related Art

It is well known in the art that the injection of gaseous fuel such as propane into the intake air of a diesel engine has several benefits. For a given work output of a diesel engine, the injection of propane reduces the amount of diesel fuel required. Similarly, for a given consumption of diesel fuel, the injection of propane increases the work output of the engine. Propane also promotes more complete combustion of diesel fuel, reducing the amount of pollutants emitted from the engine.

The prior art known to the applicant attempts to provide systems for injecting gaseous fuel into the air intake of a diesel engine at automatically varied rates. These systems inject the fuel at a rate that is automatically adjusted in response to one or more measurements such as exhaust temperature, flowrate of intake air, engine RPM, or the like. In addition, systems have been developed for turbo-charged diesel engines which adjust the amount of gaseous fuel injected in response to "boost" pressure created by the turbo-charger. These prior art systems adjust the amount of gaseous fuel injected by complex mechanical and electrical means. The automatic adjustment of these systems requires complex components and controllers, each of which are susceptible to failure.

For example, U.S. Pat. No. 6,422,015 describes a system using a progressive valve activated by turbo boost pressure. The mechanism injects an increasing amount of propane as the boost pressure increases. The system utilizes a spring and diaphragm in its automatically adjusting valve. The system is thus subject to failure due to constant stresses and the limited life of the diaphragm. Further, the system may be subject to inconsistent performance due to the effects of temperature changes on the elasticity of the diaphragm.

Many diesel engines are designed to operate at a constant engine load and corresponding constant work output. The prior art systems are designed to operate on diesel engines of varying output and are much more complex than necessary for engines that run under substantially static conditions. The additional complexity of the prior art systems reduces their reliability and needlessly increases the expense of a system for a constant-output engine. Thus, a need exists for a gaseous fuel injection system suited for diesel engines that operate under substantially constant conditions. More specifically, but not by way of limitation, a need exists for a gaseous fuel injection system of simpler construction with subsequent increased reliability and decreased cost.

BRIEF DESCRIPTION OF THE SEVERAL VIEWS OF THE DRAWINGS

FIG. 2 is an exploded cross-sectional view of a metering valve constructed in accordance with the present invention.

FIG. 3 is an assembled cross-sectional view of the metering valve of FIG. 2.

SUMMARY OF THE INVENTION

This invention provides a simplified method of injecting gaseous fuel such as propane or natural gas into the intake air of a diesel engine for the purpose of increasing diesel engine efficiency. The fuel is propelled from the tank by its own tank pressure and is passed through a standard filter. The flow of fuel is started and stopped by a shutoff valve. When the shutoff valve is open, the flow is stabilized through a commercially-available regulator. The propane then flows through a manually-adjustable, pre-set static metering valve, which allows the fuel to flow into the intake air at a constant rate. This invention utilizes a static metering valve, which is simple and dependable, yet can be manually adjusted for various engines and engine output levels. The system is designed for governed diesel engines operating under constant load. The invention provides a more reliable and cost effective system for increasing the power and efficiency of diesel engines.

DETAILED DESCRIPTION OF EXEMPLARY EMBODIMENTS

Figure 1:
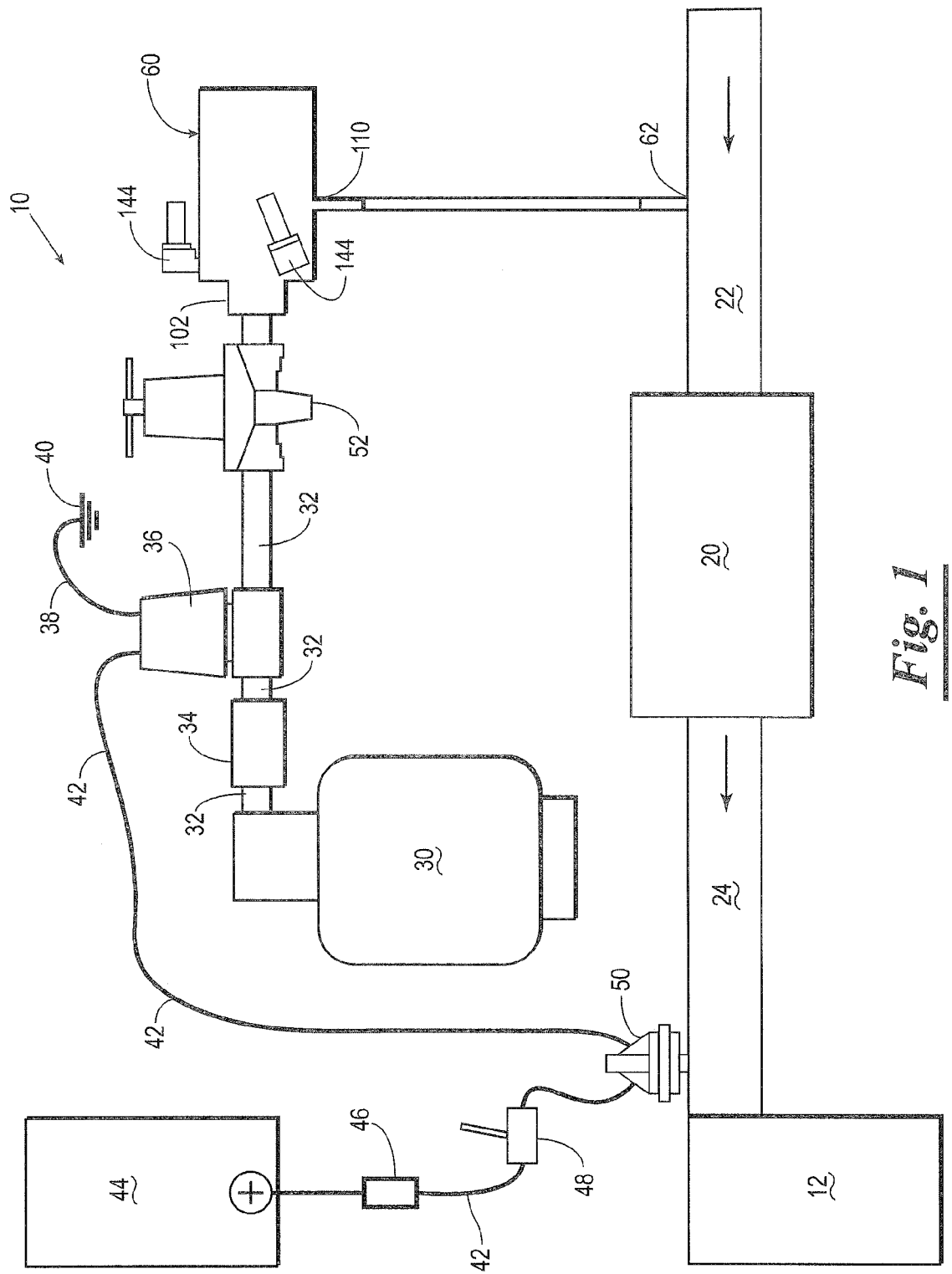
FIG. 1 is a schematic view of a secondary fuel system constructed in accordance with the present invention.

Referring now to the drawings, and more particularly to FIG. 1, one embodiment of a secondary fuel system 10 constructed in accordance with the present invention is shown. It will be appreciated by those skilled in the art that although one exemplary embodiment of system 10 is shown, the invention is properly directed to a secondary fuel system delivering a secondary fuel into the air supply of an engine at a selectively-adjustable static rate, and an engine system incorporating such a secondary fuel system. The embodiment shown in FIG. 1 is adapted for a turbo-charged diesel engine 12. It should be understood, however, that the system 10 may also be adapted to naturally-aspirated internal combustion engines. It should be noted that the engine 12 or any other engine substituted therefor will be adapted to operate or run on a primary fuel, and such operation will require a primary fuel source (not shown), such as, for example, a fuel tank, a fuel line, or the like, for supplying primary fuel to the engine 12.

The engine 12 will also preferably includes an intake manifold (not shown) in fluid communication with the engine to direct air into the engine for combustion. Additionally, the primary fuel source is preferably in fluid communication with the engine to provide primary fuel for combustion. It will be appreciated by those skilled in the art that the primary fuel source may be in fluid communication with the intake manifold, such that the primary fuel and air mix prior to entering engine cylinders (not shown), or primary fuel may be injected directly into engine cylinders (not shown) such that the primary fuel and air mix within the engine cylinders (not shown). Such features are well known in the art, and no further depiction or description is deemed necessary to permit one skilled in the art to implement the various embodiments of the present invention.

A turbo-charger 20 is depicted for compressing intake air for the diesel engine 12. An intake conduit 22 channels atmospheric air into the turbo charger 20 and an outlet conduit 24 channels compressed air from the turbo-charger 20 to the engine 12. In other embodiments, the air intake conduit 22 may directly connect to the engine 12, may be disposed between the engine 12 and the turbo-charger 20, or may be disposed in any other suitable configuration so long as the air intake 22 is in direct or indirect fluid communication with the engine 12.

The secondary fuel system stores and injects any suitable secondary fuel, preferably gaseous, which may for example be propane, natural gas, or the like. The secondary fuel is preferably different than the primary fuel with which the engine 12 is adapted to operate, such that in operation, system 10 utilizes different primary and secondary fuels. In other embodiments, the system 10 may be also adapted to function with a single fuel used for both the primary and secondary fuels.

The secondary fuel is provided by a secondary fuel source 30, such as, for example, a tank 30, which is preferably constructed of a durable material such as steel, aluminum, composite, suitable plastic or the like. In other embodiments, the secondary fuel source may comprise an external fuel line, such as for example, a natural gas line or the like. Fuel line 32 connects the tank 30 to the inlet of a fuel filter 34. The secondary fuel is preferably passed through the fuel filter 34 to remove unwanted particulates and other contaminants.

The fuel line 32 then connects the outlet of the fuel filter 34 to the inlet of a shutoff valve 36, which selectively permits fuel to flow from the fuel tank 30 via fuel line 32. In the depicted embodiment, the shutoff valve 36 is electrically actuated. Ground wire 38 connects shutoff valve 36 to ground 40. Source wire 42 connects shutoff valve 36 to a power source 44. A fuse 46 is installed along source wire 42 between the power source 44 and the shutoff valve 36. The fuse 46 prevents excessive current from overloading the circuit. The fuse 46 may be a bus-type fuse, blade-type fuse, fusible link, or any other suitable type of fuse.

The circuit also preferably includes a switch 48, such as a toggle switch, along source wire 42 between the shutoff valve 36 and the power source 44. The switch 48 provides a manual means for opening and closing the circuit, and thereby the shutoff valve 36, such that the flow of fuel through fuel line 32 is manually allowed or prevented.

The circuit along source wire 42 also includes a pressure switch 50 which provides the primary mechanism for signaling the shutoff valve 36 to open or close. The sensor of pressure switch 50 is installed to measure the "boost" pressure of the pressurized air coming out of the turbo-charger 20. When the boost pressure reaches a certain pre-determined level, the pressure switch 50 sends a signal or closes the circuit along source wire 42, causing the shutoff valve 36 to open and begin the flow of fuel. When the boost pressure falls below the pre-determined level, the pressure switch 50 sends a signal or opens the circuit along source wire 42, causing the shutoff valve 36 to close and stop the flow of fuel. In other embodiments, the pressure switch 50 may be replaced with a sensor 50, and shutoff valve 36 may be adapted to open or close responsive to certain levels of measurements, such as pressure, measured by the sensor 50. The shutoff switch 36 may also function as a safety device, as it will stop the flow of secondary fuel if the pressure drops due to engine malfunction; or if the engine stops due to a lack of primary fuel.

The outlet of the shutoff valve 36 is connected to a regulator 52 via fuel line 32. The outlet of the regulator 52 is connected to a metering valve 60 via an inlet 102. The regulator 52 stabilizes the flow of the fuel and causes the fuel to flow at a constant pressure into the metering valve 60. The regulator 52 may also be provided with a backflow preventer or the like to further regulate the flow of secondary fuel between the fuel source 30 and the metering valve 60.

The metering valve 60 is preferably a selectively-adjustable static metering valve 60, that is, is selectively and/or manually pre-adjustable to a static setting (see detailed description below and FIG. 2). Thus, given the constant-pressure inflow of fuel from the regulator 52 into the metering valve 60, a substantially-constant flow rate of fuel passes through the metering valve 60. The fuel then flows from an outlet 110, and a fuel fitting 112, through the fuel line 32, and into the air intake conduit 22 via a fuel port 62, to be delivered to the engine 12 at a substantially constant rate and over an extended duration of time, preferably until the engine 12 is turned off, runs out of primary fuel, or an operating parameter of the engine 12, for example, the RPM, boost pressure, or the like, falls below a predetermined threshold.

It should be noted that the pressure switch 50 or the switch 48 may be replaced, combined, or eliminated without departing from the spirit of the invention. The pressure switch 50 is only one example of a switch or sensor that could be used to selectively trigger the shutoff valve 36 or otherwise operate the secondary fuel system. For example, the secondary fuel system could be selectively operated by one or more switches based on a pre-determined RPM, fuel pressure, airflow rate, or the like. The switch 48 provides an optional means for manually preventing operation of the secondary fuel system and may be entirely omitted or combined with one or more other switches. All switches may also be completely omitted, for example, and a manual shutoff valve 36 could be used.

Similarly, components along the fuel line 32 such as the fuel filter 34, shutoff valve 36, regulator 52, and metering valve 60, may be replaced with equivalent devices, rearranged, or combined without departing from the spirit of the invention. For example, the shutoff valve 36 may be relocated adjacent to the fuel tank 30, or the fuel filter 34 and regulator 52 may be combined into a single assembly.

Referring now to FIGS. 2 and 3, FIGS. 2 and 3 depict an exploded cross-sectional view and an assembled cross-sectional view of a metering valve assembly 60, respectively, constructed in accordance with the present invention. A valve body 100 houses the internal valve parts and provides flow channels for directing the fuel. The valve body 100 is constructed preferably of aluminum, but may be constructed from any suitably durable material such as steel, composite, plastic, or the like.

Fuel preferably flows into the valve body 100 via the fuel inlet 102. The fuel inlet 102 is preferably threaded to receive a male connector from the regulator 52. In other embodiments, the fuel inlet 102 may be adapted to connected to the regulator 52, or to the fuel line 32 directly or indirectly, for example, via intermediate fittings (not shown), such as with threads, welds, interlocking tabs and slots, press-fitting, or the like. The valve body 100 is preferably provided with a tapered inlet shoulder 104 to transition the fuel from the fuel inlet 102 to a valve channel 106.

The valve channel 106 is threaded to selectively receive a valve jet 108. The valve jet 108 is preferably cylindrical and has a flow channel 108a extending therethrough to a valve seat 108b. The valve seat 108b is tapered inward toward the center of the flow channel 108a. The valve jet 108 is threaded into the valve channel 106 such that the valve jet 108 is disposed between the fuel inlet 102 and the fuel outlet 110, which preferably extends laterally from the valve channel 106 to a fuel fitting 112 on an exterior surface of the valve body 100.

The valve channel 106 preferably terminates with a shoulder recess 114. A valve shoulder gasket 116 fits between the shoulder recess 114 and a valve shoulder 118. The valve shoulder gasket 116 is preferably formed from a flexible and/or resilient material such as felt, cork, cardboard, rubber, or the like such that it can be compressed between the shoulder recess 116 and the valve shoulder 118 to provide a seal. In other embodiments, the gasket 116 may be omitted, such as where the valve shoulder 118 is formed of a malleable material capable of providing a sufficient seal.

The valve shoulder 118 is generally cylindrical and has an insertion portion 118a and a shoulder portion 118b. The insertion portion 118a is threaded to screw into the valve channel 106. The shoulder portion 118b provides a surface adjacent to the shoulder recess 114 to compress the valve shoulder gasket 116 therebetween. The valve shoulder 118 also includes a needle channel 118c extending therethrough. The needle channel 118c is preferably threaded to adjustably and selectively receive a valve needle 120. In other embodiments, the valve shoulder 118 and the valve jet 108 may be of unitary construction so as to comprise a single piece.

The valve needle 120 has a threaded body portion 120a terminating at a first end with a conical needle portion 120b and terminating at a second end with an enlarged head portion 120c. The threaded body portion 120a is sized and threaded to screw into the needle channel 118c. The needle portion 120b is preferably sized and tapered to adjustably insert into the valve seat 108b.

The needle portion 120b of the valve needle 120 inserts sequentially through a bias spring 122, a compression washer 124, and a needle O-ring 126 such that the bias spring 122, the compression washer 124, and the needle O-ring 126 slide over the threaded body portion 120a. The valve needle 120 is then threaded into the valve channel 118c such that the bias spring 122 is adjacent to the enlarged head portion 120c and the needle O-ring 126 is adjacent to the valve channel 118c.

The needle O-ring 126 is preferably a standard O-ring constructed of a suitably resilient material such as rubber, plastic, PVC, cardboard, or the like. The compression washer 124 is an appropriately-sized flat washer that compresses the needle O-ring 126 to seal any gaps between the valve needle 120 and at least one of the valve channel 118c and the O-ring cavity 118d. In other embodiments, the compression washer 124 may be combined with the bias spring 122 or the compression washer 124 may be omitted such that the bias spring 122 directly compresses the O-ring 126. The bias spring 122 is constructed of any suitable material such as spring steel or the like.

When assembled, the needle portion 120b partially inserts into the valve seat 108b but preferably does not fully contact or engage the valve seat 108b so as to leave an annular passageway therebetween to allow fuel to flow. The bias spring 122 is preferably partially compressed to apply pressure, on one side to the compression washer 124, and on the other side to the enlarged head portion 120c to prevent the valve needle 120 from turning and thereby affecting its adjustment.

A valve cover 128 fits adjacent to the valve body 100. The valve cover 128 is preferably formed with a needle cavity 128a that provides clearance for the valve needle 120 and an O-ring groove 128b formed to receive an O-ring 130. An O-ring 130 is preferably compressed between the valve cover 128 and the valve body 100 to provide a seal therebetween. The valve cover 100 is secured to the valve body 100, preferably with one or more screws 134, but may also be secured with another suitable fastening device such as rivets, adhesive, keyed or threaded portions, or the like.

In operation of the metering valve 60, fuel flows sequentially through the fuel inlet 102, into the valve channel 106, through the flow channel 108a, between the valve seat 108b and the needle portion 120b, back into the valve channel 106, and through the fuel outlet 110. In other embodiments, the fuel may flow in through what is depicted herein as the fuel outlet 110, into the valve channel 106, between the valve seat 108b and the needle portion 102b, through the flow channel 108a, back into the flow channel 106, and out through what is depicted herein as the fuel inlet 102.

Coarse adjustment of the metering valve can be accomplished by installing valve jets 108 with flow channels 108a of different sizes to increase or decrease the maximum amount of fuel allowed to flow through the valve jet 108. Fine adjustment of the metering valve 60 can be accomplished by rotating the valve needle 120 to adjust the annular area between the needle portion 120b and the valve seat 108b, thereby varying the amount of cross-sectional area available for fuel flow.

Further, as shown in the preferred embodiment, a fluid channel 140 is preferably provided through the valve body 100. The fluid channel 140 in the preferred embodiment is a circular channel running parallel to two of the sides and forming a 90 degree bend. However, the fluid channel 140 may be any effective shape or size, and may comprise a plurality of channels or cavities. The fluid channel 140 does not intersect or allow fluid communication with the valve channel 106 or the fuel outlet 110. The fluid channel 140 is provided so a fluid, preferably a liquid, may be passed through the valve body 100 to selectively heat or cool the valve body 100 as necessary to provide a substantially constant temperature for the gaseous secondary fuel.

The fluid channel 140 preferably terminates at fluid ports 142 in at least two distinct locations on the surface of the valve body 100 to allow fluid to flow from one fluid port 142 to another. In the preferred embodiment, the fluid ports 142 are adapted to receive a fluid fitting 144, through which a heat-transfer and/or temperature-control fluid flows into or out of the fluid channel 140. The fluid fitting 144 may be any suitable fitting to allow fluid communication with a fluid source and may also be formed integrally or as a single piece with the valve body 100. For example, the fluid fittings 144 may be connected to the cooling and/or heating system of an engine system such that antifreeze, water, and/or any other suitable heat-transfer and/or temperature-control fluid may flow through the valve body 100 to heat, cool, and/or regulate the temperature of the valve body 100. For example, as propane exits a tank and expands, it will often become relatively cold and may, in some instances, cause the valve 60 to freeze and/or plug. Thus, a suitable heat-transfer and/or temperature-control fluid may be passed through the valve body 100, via the fluid fittings 144, so as to ensure the temperature of the valve body 100 remains high enough to permit the valve 60 to function properly. In other embodiments, it may be preferably or necessary to cool the valve body 100.

Figure 4:
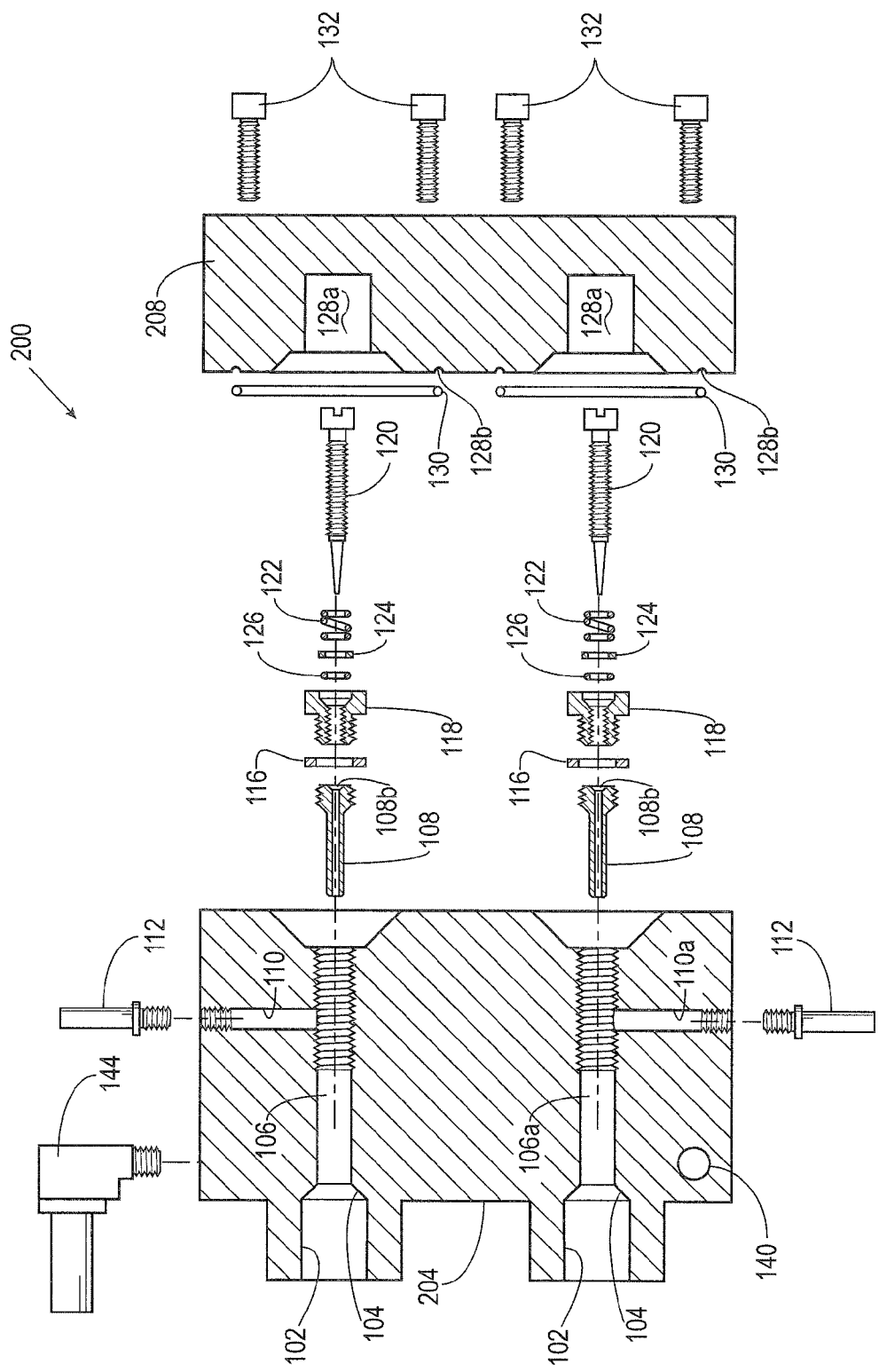
FIG. 4 is an exploded cross-sectional view of a double metering valve constructed in accordance with the present invention.
Figure 5:
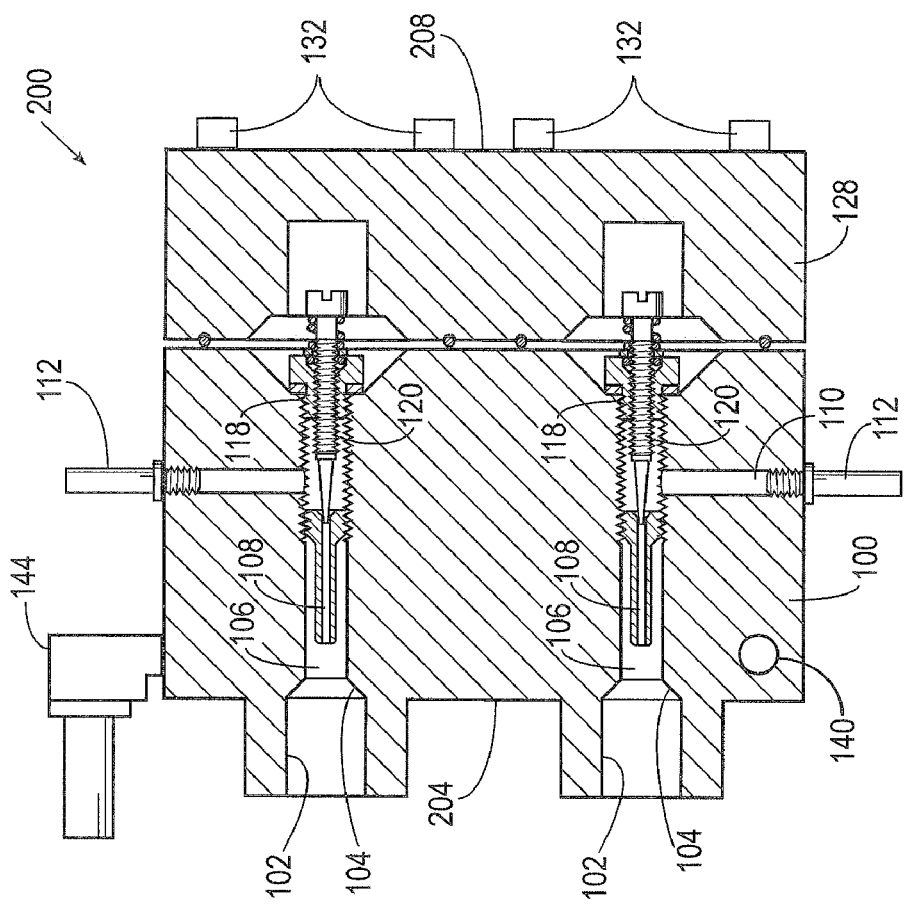
FIG. 5 is an assembled cross-sectional view of the double metering valve of FIG. 4.

Referring now to FIGS. 4 and 5, exploded and assembled cross-sectional views of a double metering valve 200 constructed in accordance with the present invention are shown therein, respectively. As will be appreciated by those skilled in the art, the primary difference between the double metering valve 200 of FIGS. 4 and 5, and the metering valve 60 of FIGS. 2 and 3, is that the double metering valve 200 is preferably provided with a housing 204 having: two fuel inlets 102 and 102a, two inlet shoulders 104 and 104a, two valve channels 106 and 106a, two fuel outlets 110 and 110a, and two shoulder recesses 114 and 114a. Similarly, the double metering valve 200 is preferably provided with a valve cover 208 having two needle cavities 128a. Preferably each of the above-listed features of the valve body 204 and the valve cover 108 are of substantially similar construction and function to the correspondingly-numbered features of the metering vale 60 of FIGS. 2 and 3, with the exception of relatively-minor differences to account for the geometrical configuration required to provide two valves within the single valve body 204. The remainder of valve components are preferably identical in construction and function to those of the metering valve 60 of FIGS. 2 and 3, and are merely provided in pairs for the double metering valve 204, i.e., the valve jet 108, the valve shoulder gasket 116, the valve shoulder 118, the valve needle 120, the bias spring 122, the compression washer 124, the needle O-ring 126, and the O-ring 130.

As best shown in FIG. 5, the double metering valve 200 is assembled in a substantially similar manner as the metering valve 60 of FIGS. 2 and 3, with the primary exception being that the double metering valve 204 is provided with two functional valves. As will be appreciated by those skilled in the art, the valve body 204 may be formed with any suitable geometry, so long as the valve channels 106 and 106a are not in fluid communication with one another, and the fuel outlets 110 and 110a are not in fluid communication with one another. For example, the configuration of the valve body 204 could be changed such that the fuel outlets 110 and 110a are parallel to one another to make it easier to direct fuel from the double metering valve 200. In other embodiments, the valve body 204 may be provided with any number of functioning valves within a single valve body, as is suited or advantageous to particular engines, operating conditions, or the like. For example, the manually-adjustable static metering valve of the present invention could be provided with 3, 4, 5, 6, or more, functioning valves.

Figure 6:
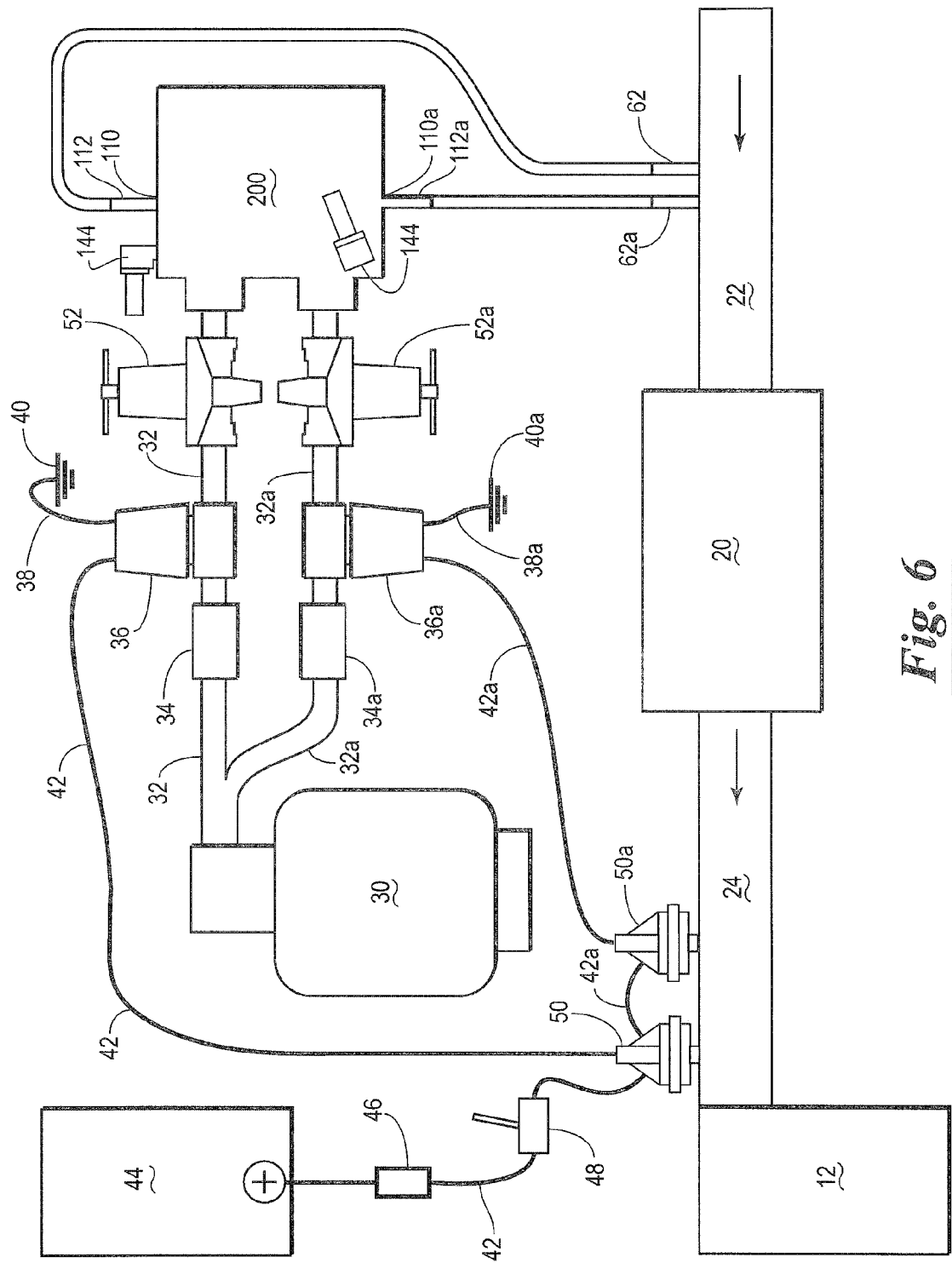
FIG. 6 is a schematic view of a secondary fuel system having the double metering valve of FIGS. 4 and 5 and constructed in accordance with the present invention.

Referring now to FIG. 6, a secondary fuel system 212 having the double metering valve 200 of FIGS. 4 and 5 is shown constructed in accordance with the present invention. The secondary fuel system 10 of FIG. 6 is substantially similar to that of FIG. 1, with the primary exception that there are two of a number of components to permit two-stage functioning of the system 10. As shown, the secondary fuel system 212 is implemented in conjunction with an engine system, which may be nearly any engine system known in the art, such as any suitable supercharged, turbocharged, or naturally-aspirated internal-combustion engine.

More specifically, the secondary fuel system 212 of FIG. 6 is preferably provided with a pair of fuel lines 32 and 32a in fluid communication with the secondary fuel source 30 to provide secondary fuel to both valves of the double metering valve 200. The secondary fuel system 212 is preferably provided with a pair of filters 34 and 34a, a pair of shutoff valves 36 and 36a, a pair of switches/sensors 50 and 50a, and a pair of regulators 52 and 52a; which are all substantially similar in construction and function to their correspondingly-numbered counterparts in FIG. 1. The switches/sensors 50 and 50a are shown connected by wire 42 in series, as is well known in the art, but may also be connected in parallel, provided with entirely separated circuits, or provided power and/or communication with other components of the system 212, in any suitable fashion. Although the system 212 is shown with two filters 34 and 34a, the system 212 may, in other embodiments, may be provided with a filter 34 disposed upstream of the point where fuel line 32a branches away from fuel line 32. Similarly, in other embodiments, the system 212 may be provided with a single regulator 52 regulating the flow of secondary fuel in both fuel lines 32 and 32a.

In operation, the system 212 of FIG. 6 also functions similarly to the system 10 of FIG. 1. However, the system 212 is preferably provided with the capability of two-stage operation. Specifically, the switches/sensors 50 and 50a operate as in the system of FIG. 1, but each may be set to open or close their respective shutoff valve 36 or 36a at different pre-set measurements or readings. In conjunction therewith, the two branches of the double metering valve 200 can be set to permit different rates of flow, such that each branch permits a more optimum rate of flow for a corresponding engine operation level. For example, switch 50 can be pre-set to open shutoff valve 36 when the air in the conduit 24 reaches 10 pounds of boost pressure, and switch 50a can be pre-set to open shutoff valve 36a when the air in the conduit 24 reaches 15 pounds of boost pressure, such that the system 212 delivers relatively more secondary fuel to the engine 12 when the boost pressure is at 15 pounds than when the boost pressure is at 10 pounds, and delivers no secondary fuel to the engine 12 when the boost pressure is less than 10 pounds.

In yet another embodiment the system 212 can be configured for three-stage operation. For example, the switches/sensors 50 and 50a, and the double metering valve 200 can be set to operate as follows. The switches 50 and 50a can be set to close both shutoff valves 36 and 36a when the engine operating parameter is below an initial threshold, for example 10 pounds of boost pressure. The switch 50 can be set to open the shutoff valve 36 between the initial threshold and a second threshold, for example 15 pounds of boost pressure, and to open the shutoff valve 36 above a third threshold, for example 20 pounds of boost pressure; such that the shutoff valve 36 is open between 10 and 15 pounds of boost pressure, is closed between 15 and 20 pounds of boost pressure, and is open again when the boost pressure exceeds 20 pounds. Concurrently, the switch 50a can be set to open the shutoff valve 36a above the second threshold, such that the shutoff valve 36a is open when the boost pressure exceeds 15 pounds.

Thus, below 10 pounds of boost pressure, both shutoff valve 36 and 36a would be closed; between 10 and 15 pounds, shutoff valve 36 would be open and shutoff valve 36a would be closed; between 15 and 20 pounds, shutoff valve 36 would be closed and the shutoff valve 36a open; and above 20 pounds, both shutoff valves 36 and 36a would be open. In this way, the system 212 would deliver no secondary fuel to the engine 12 when the boost pressure is below 10 pounds, would deliver some secondary fuel to the engine 12 when the boost pressure is between 10 and 15 pounds, would deliver relatively more secondary fuel to the engine 12 when the boost pressure is between 15 and 20 pounds, and would deliver a relatively-maximum amount of secondary fuel to the engine 12 when the boost pressure exceeds 20 pounds. Such staged operation permits more optimal delivery of secondary fuel to the engine 12, while utilizing the simpler and particularly more durable manually-adjustable static metering valves of the present invention.

Such staged operation may be implemented in any of the ways described above with respect to the system 10 and metering valve 60. For example, the switch/sensor 50 and/or 50a may measure any suitable engine parameter. In other embodiments, the system 212 may also be implemented with two metering valves 60 rather than a double metering valve 200. In yet further embodiments, the system 212 may be implemented with any suitable number of metering valves 60 and/or multiple metering valves such as the double metering valve 200. In one embodiment, the switch/sensors 50 and 50*a* may be replaced with a single sensor connected to, or otherwise in communication with, the shutoff valves 36 and 36*a*, and the shutoff valves 36 and 36*a* pre-set to open and closed at pre-determined measurements of an engine parameter by the sensor 50.

From the above description, it is clear that the present invention is well adapted to carry out the objects and to attain the advantages mentioned herein as well as those inherent in the invention. While presently preferred embodiments of the invention have been described for the purposes of this disclosure, it will be understood that numerous changes may be made which will readily suggest themselves to those skilled in the art and which are accomplished within the spirit of the invention disclosed, and as defined in the appended claims.

What is claimed is:

1. An engine system comprising:
    a secondary fuel source for providing a secondary fuel;
    a metering valve for delivering the secondary fuel at a substantially pre-determined rate, the metering valve comprising:
        a valve body having a fuel inlet, a fuel outlet, and a fuel passage between the fuel inlet and the fuel outlet, and wherein the fuel inlet is in fluid communication with the secondary fuel source to receive the secondary fuel from the secondary fuel source; and
        a selectively-adjustable static valve mechanism disposed within the fuel passage of the valve body between the fuel inlet and the fuel outlet;
    an air intake in fluid communication with the fuel outlet of the metering valve to receive the secondary fuel from the metering valve so as to permit the secondary fuel to mix with air; and
    an internal combustion engine adapted to operate on a primary fuel other than the secondary fuel, and having an intake manifold adapted to receive primary fuel from a primary fuel source, the intake manifold in fluid communication with the air intake to receive a mixture of air and secondary fuel from the air intake, the internal combustion engine having a cooling system,
    wherein the valve body further has at least one fluid port and at least one fluid passage in fluid communication with the at least one fluid port, neither of which is in fluid communication with the fuel inlet, fuel outlet, or fuel passage of the valve body, and wherein the at least one fluid port is in fluid communication with the cooling system of the primary engine system to permit a heat-transfer fluid to circulate through the at least one fluid passage to substantially regulate the temperature of the valve body.

2. The engine system of claim 1, wherein the secondary fuel is selected from the group consisting of: propane, natural gas, gasoline, methane, butane, and oxygen.

3. The engine system of claim 1, wherein the primary fuel is selected from the group consisting of: diesel fuel, gasoline, and natural gas.

4. The engine system of claim 3, further comprising:
    an engine sensor in electrical communication with the shutoff valve and sensing at least one operating parameter of the engine, and wherein the shutoff valve selectively permits the secondary fuel to flow between the secondary fuel source and the metering valve responsive to the at least one parameter of the primary engine system.

5. The engine system of claim 1, further comprising:
    a pressure regulator in fluid communication with both of the secondary fuel source and the metering valve to regulate the flow of fuel between the secondary fuel source and the fuel inlet of the static metering valve.

6. The engine system of claim 1 further comprising:
    a shutoff valve in fluid communication with both of the secondary fuel source and the metering valve to selectively permit the flow of secondary fuel between the secondary fuel source and the metering valve.

7. A secondary fuel system for use with an engine system including an internal combustion engine and an air intake, the engine having a cooling system and adapted to operate on a primary fuel other than the secondary fuel and having an intake manifold adapted to receive the primary fuel from a primary fuel source, the air intake adapted to deliver air to the intake manifold of the engine, the secondary fuel system comprising:
    a secondary fuel source for providing a secondary fuel; and
    a metering valve for delivering the secondary fuel at a substantially pre-determined rate, the metering valve comprising:
        a valve body having a fuel inlet, a fuel outlet, and a fuel passage between the fuel inlet and the fuel outlet, and wherein the fuel inlet is in fluid communication with the secondary fuel source to receive the secondary fuel from the secondary fuel source; and
        a selectively-adjustable static valve mechanism disposed within the fuel passage of the valve body between the fuel inlet and the fuel outlet,
    wherein the valve body further has at least one fluid port and at least one fluid passage in fluid communication with the at least one fluid port, neither of which is in fluid communication with the fuel inlet, fuel outlet, or fuel passage of the valve body, and wherein the at least one fluid port is adapted for connection to the cooling system of the primary engine system to permit fluid communication with the cooling system so as to permit a heat-transfer fluid to circulate through the at least one fluid passage to substantially regulate the temperature of the valve body.

8. The secondary fuel system of claim 7, wherein the secondary fuel is selected from the group consisting of: propane, natural gas, gasoline, methane, butane, and oxygen.

9. The secondary fuel system of claim 7, wherein the primary fuel is selected from the group consisting of: diesel fuel, gasoline, and natural gas.

10. The secondary fuel system of claim 7, further comprising:
    a pressure regulator in fluid communication with both of the secondary fuel source and the metering valve to regulate the flow of fuel between the secondary fuel source and the fuel inlet of the static metering valve.

11. The secondary fuel system of claim 7, further comprising:
    a shutoff valve in fluid communication with both of the secondary fuel source and the metering valve to selectively permit the flow of secondary fuel between the secondary fuel source and the metering valve.

12. The secondary fuel system of claim 7, further comprising:
    an engine sensor in electrical communication with the shutoff valve and adapted to sense at least one operating parameter of the engine system, and wherein the shutoff valve selectively permits the secondary fuel to flow between the secondary fuel source and the metering valve responsive to the at least one parameter of the primary engine system.

* * * * *